US011663655B2

(12) United States Patent
Benkreira et al.

(10) Patent No.: US 11,663,655 B2
(45) Date of Patent: May 30, 2023

(54) AUGMENTING ONLINE TRANSACTION STATEMENTS USING E-COMMERCE RECEIPTS

(71) Applicant: Capital One Services, LLC, McLean, VA (US)

(72) Inventors: Abdelkader M'Hamed Benkreira, New York, NY (US); Joshua Edwards, Philadelphia, PA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 288 days.

(21) Appl. No.: 16/502,513

(22) Filed: Jul. 3, 2019

(65) Prior Publication Data

US 2021/0004880 A1    Jan. 7, 2021

(51) Int. Cl.
*G06Q 40/02* (2023.01)
*G06Q 30/04* (2012.01)
*G06Q 20/40* (2012.01)
*G06V 30/413* (2022.01)
*G06V 30/40* (2022.01)

(52) U.S. Cl.
CPC .......... *G06Q 40/02* (2013.01); *G06Q 20/401* (2013.01); *G06Q 30/04* (2013.01); *G06V 30/40* (2022.01); *G06V 30/413* (2022.01)

(58) Field of Classification Search
None
See application file for complete search history.

(56) References Cited

U.S. PATENT DOCUMENTS

| | | | |
|---|---|---|---|
| 8,326,754 B2 * | 12/2012 | Bandych | G06Q 20/10 705/40 |
| 9,268,763 B1 * | 2/2016 | Esho | G06F 16/93 |
| 9,922,375 B1 * | 3/2018 | Neveu | G06Q 40/12 |
| 10,055,769 B1 * | 8/2018 | Todd | G06Q 20/14 |
| 10,229,314 B1 * | 3/2019 | Mitchell | G06K 9/00442 |
| 10,685,407 B1 * | 6/2020 | Cabrera | G06Q 40/123 |
| 10,878,453 B2 * | 12/2020 | Pesochinsky | G06Q 30/0257 |
| 10,929,921 B1 * | 2/2021 | Mao | G06Q 20/18 |
| 10,990,940 B1 * | 4/2021 | Asthana | H04L 67/02 |

(Continued)

OTHER PUBLICATIONS

Andre Bradshaw, "JavaScript DOM scraping—quick lesson" YouTube video, live streamed Jan. 6, 2019 (Year: 2019).*

(Continued)

*Primary Examiner* — Calvin L Hewitt, II
*Assistant Examiner* — Claire A Rutiser
(74) *Attorney, Agent, or Firm* — DLA Piper LLP US

(57) ABSTRACT

Disclosed embodiments include systems and methods for improving the accuracy of online banking systems. In various embodiments, the system includes a user device capturing receipt information from one or more e-commerce application and a server device for associating captured receipt information with transaction data. The system may include a browser extension for facilitating automatic capture of receipt information and a matching module for associating receipt information with transaction data. In various embodiments, transactions displayed in transaction statements within an online banking application are augmented with item level data including product name, price, and vendor for each product included in a transaction.

18 Claims, 9 Drawing Sheets

(56) References Cited

U.S. PATENT DOCUMENTS

| | | | | |
|---|---|---|---|---|
| 11,023,720 | B1* | 6/2021 | Desai | G06F 40/295 |
| 2006/0248500 | A1* | 11/2006 | O'Donoghue | G06F 21/57 |
| | | | | 717/100 |
| 2007/0016897 | A1* | 1/2007 | Todd | G06F 9/5055 |
| | | | | 717/143 |
| 2008/0120129 | A1* | 5/2008 | Seubert | G06Q 40/125 |
| | | | | 705/305 |
| 2011/0276414 | A1* | 11/2011 | Subbarao | G06Q 20/102 |
| | | | | 705/40 |
| 2012/0173966 | A1* | 7/2012 | Powell | G06F 16/93 |
| | | | | 715/234 |
| 2013/0024757 | A1* | 1/2013 | Doll | G06F 40/143 |
| | | | | 715/204 |
| 2013/0332283 | A1* | 12/2013 | Faith | G06Q 30/02 |
| | | | | 705/14.64 |
| 2015/0032526 | A1* | 1/2015 | Calman | G06Q 30/0224 |
| | | | | 705/26.7 |
| 2015/0032602 | A1* | 1/2015 | Blackhurst | G06Q 40/02 |
| | | | | 705/39 |
| 2015/0032615 | A1* | 1/2015 | Blackhurst | G06Q 20/108 |
| | | | | 705/42 |
| 2015/0039502 | A1* | 2/2015 | Blackhurst | G06Q 10/0838 |
| | | | | 705/42 |
| 2015/0248719 | A1* | 9/2015 | Hansen | G06F 3/0304 |
| | | | | 705/26.63 |
| 2016/0019657 | A1* | 1/2016 | Mande | G06Q 40/12 |
| | | | | 705/30 |
| 2016/0117398 | A1* | 4/2016 | Dakua | G06F 16/334 |
| | | | | 707/709 |
| 2016/0188548 | A1* | 6/2016 | Ciabarra, Jr. | G06F 40/14 |
| | | | | 715/234 |
| 2016/0307277 | A1* | 10/2016 | Wengrower | G06F 16/9535 |
| 2017/0017650 | A1* | 1/2017 | Ciabarra, Jr. | G06F 40/131 |
| 2017/0147979 | A1* | 5/2017 | Brady | G06F 40/205 |
| 2018/0095941 | A1* | 4/2018 | Ciabarra, Jr. | G06F 40/106 |
| 2019/0141466 | A1* | 5/2019 | Dhua | H04W 60/02 |
| 2020/0120113 | A1* | 4/2020 | Burgis | H04L 63/1483 |
| 2020/0151578 | A1* | 5/2020 | Chen | G06K 9/6256 |
| 2020/0151615 | A1* | 5/2020 | Krishnan | G06N 20/00 |

OTHER PUBLICATIONS

Chen et al, Implementing Document Imaging and Capture Solutions with IBM Datacap, Oct. 27, 2015, IBM Redbooks, pp. 1-10, downloaded from https://www.redbooks.ibm.com/abstracts/sg247969.html (Year: 2015).*

* cited by examiner

260

Receipt

Order Placed: March 7, 2019
Order Number: 132-149940-55551

Items Ordered

1 of: *Item 1*
1 of: *Item 2*
1 of: *Item 3*

Shipping Address

Jane Doe
1 Mulberry St
Springfield, MA  01105

Payment

Visa  |  Last digits: 1234

Billing Address

Jane Doe
1 Mulberry St
Springfield, MA  01105

Subtotal:  $34.99
Shipping & Handling: $4.00
----
Total before tax:  $38.99
Sales Tax:  $2.44
---
Total:  $41.43

AUGMENTING ONLINE TRANSACTION STATEMENTS USING E-COMMERCE RECEIPTS

FIELD OF DISCLOSURE

The present disclosure relates generally to data processing methods for financial applications, and, more specifically, to augmenting online banking systems with receipts collected from e-commerce applications.

BACKGROUND

Financial institutions, such as banks and credit card companies, may provide customers with regular statements showing recent credit and debit transactions associated each customer account. Such statements may be physically mailed to the customers and/or made available in electronic form online via a website or mobile application. Transactions can include, for example, purchases made online via e-commerce websites and applications, including websites and applications associated with various merchants.

Existing transaction statements may include, for each transaction, the transaction date, a string identifying the merchant associated with the transaction (if any), and the transaction amount. Currently, if a customer purchases multiple items from a merchant as part of a single purchase transaction, the corresponding transaction statement may include a single line item representing the aggregate cost of all the items, and may not include any information about the individual items associated with the transaction (referred to herein as "item level data"). This makes it difficult for customers to review and account for all the expenditures

SUMMARY

In one aspect, disclosed herein are computer-implemented methods for improving the accuracy of online banking systems comprising: parsing, by a capture agent, graphical user interfaces (GUIs) displayed on a user device; detecting, based on the parsing, a receipt displayed on the user device, the receipt comprising information about one or more items purchased by a user of the user device including a description of the one or more items and a price of the one or more items; sending the receipt information to a server device, the server device configured to: receive transaction data for a plurality of transactions associated with the user, the transaction data comprising an amount for each of the transactions, match the receipt to one or more of the transactions based at least on comparing at least the price of the one or more items to the transaction amount, store an association between the receipt and the one or more matching transactions, and provide the user with a transaction statements in an online banking system, the transaction statements being augmented using the stored association between the receipt and the one or more matching transactions.

In one aspect, the capture agent is a plug-in for a web browser and the computer implemented methods further comprise receiving the plug-in from the server device. In one aspect, the computer implemented methods further comprise parsing the GUIs by parsing Document Object Model (DOM) elements from a plurality of web pages rendered by the web browser. In one aspect the capture agent parses by parsing a first GUI displayed on the user device; determining that the first GUI is not a receipt; waiting for a predetermined amount of time; and after the waiting, parsing, a second GUI displayed on the user device.

In one aspect, the capture agent detects a receipt by: determining a merchant associated with the parsed GUIs; and using, by the capture agent, specific parsing logic associated with the merchant to detect the receipt. In one aspect, the capture agent comprises a plug-in for a mobile application, wherein the mobile application comprises at least one of an online banking application or an e-commerce application. In one aspect, the capture agent parses the GUIs by parsing Document Object Model (DOM) elements from a plurality of GUIs rendered by the mobile application.

In one aspect, described herein are computer-implemented methods for improving the accuracy of online banking systems comprising: receiving receipt information from a user device, the receipt information comprising information about one or more items purchased by a user of the user device including a description of the one or more items and a price of the one or more items, the receipt information captured from graphical user interfaces (GUIs) displayed on a user device; receiving transaction data for a plurality of transactions associated with the user, the transaction data comprising an amount for each of the transactions; matching a receipt to one or more of the transactions based at least on comparing at least the price of the one or more items included in the receipt to the transaction amount; storing an association between the receipt and the one or more matching transactions; and providing the user with a transaction statement in an online banking system, the transaction statement being augmented using the stored association between the receipt and the one or more matching transactions.

In one aspect, the computer implemented methods further comprise: receiving transaction data from a bank computer network; and storing the transaction data to a transactions queue, wherein matching the receipt to the one or more of the transactions comprises searching the transactions queue. In one aspect, computer implemented methods match receipts to one or more of the transactions by identifying a plurality of transactions having a total amount approximately equal to the price of the one or more items and/or estimating a tax amount for the receipt based on a shipping address associated with the receipt, wherein matching the receipt to the one or more of the transactions comprises using the estimated tax amount for the receipt. In one aspect, the receipt information parsed from GUIs is obtained using one or more merchant specific rules corresponding to one or more e-commerce merchants.

In one aspect, as described herein computer implemented methods estimate a shipping amount for the receipt based on a shipping address associated with the receipt, wherein matching the receipt to the one or more of the transactions comprises using the estimated shipping amount. In one aspect, computer implemented methods use the receipt to verify accuracy of one or more transaction amounts displayed in the one or more matching transactions. In one aspect, the transaction statement is searchable by one or more items included in the receipt. In one aspect, computer implemented method further display, with the one or more matching transactions, in an online banking application GUI, receipt information for one or more items included in the receipt.

In one aspect, disclosed herein are computer implemented methods for improving the accuracy of online banking systems comprising: parsing, by a capture agent, graphical user interfaces (GUIs) displayed on a user device; detecting, based on the parsing, a receipt displayed on the user device, the receipt comprising information about one or more items purchased by a user of the user device including a description of the one or more items and a price of the one or more items; capturing, from the GUIs, merchant content comprising receipt information and one or more GUI elements; sending the merchant content to a server device, the server device configured to: receive transaction data for a plurality of transactions associated with the user, the transaction data comprising an amount for each of the transactions, match the receipt to one or more of the transactions based at least on comparing at least the price of the one or more items to the transaction amount, store an association between the receipt and the one or more matching transactions, and provide the user with a transaction statement in an online banking system, the transaction statement including the one or more matching transactions augmented by merchant content including the receipt having the stored association between the receipt and the one or more matching transactions.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIGS. 2A-2D depict illustrative graphical user interfaces (GUIs) that may be used within e-commerce websites and/or applications, according to embodiments of the disclosure.

DETAILED DESCRIPTION

Figure 1:
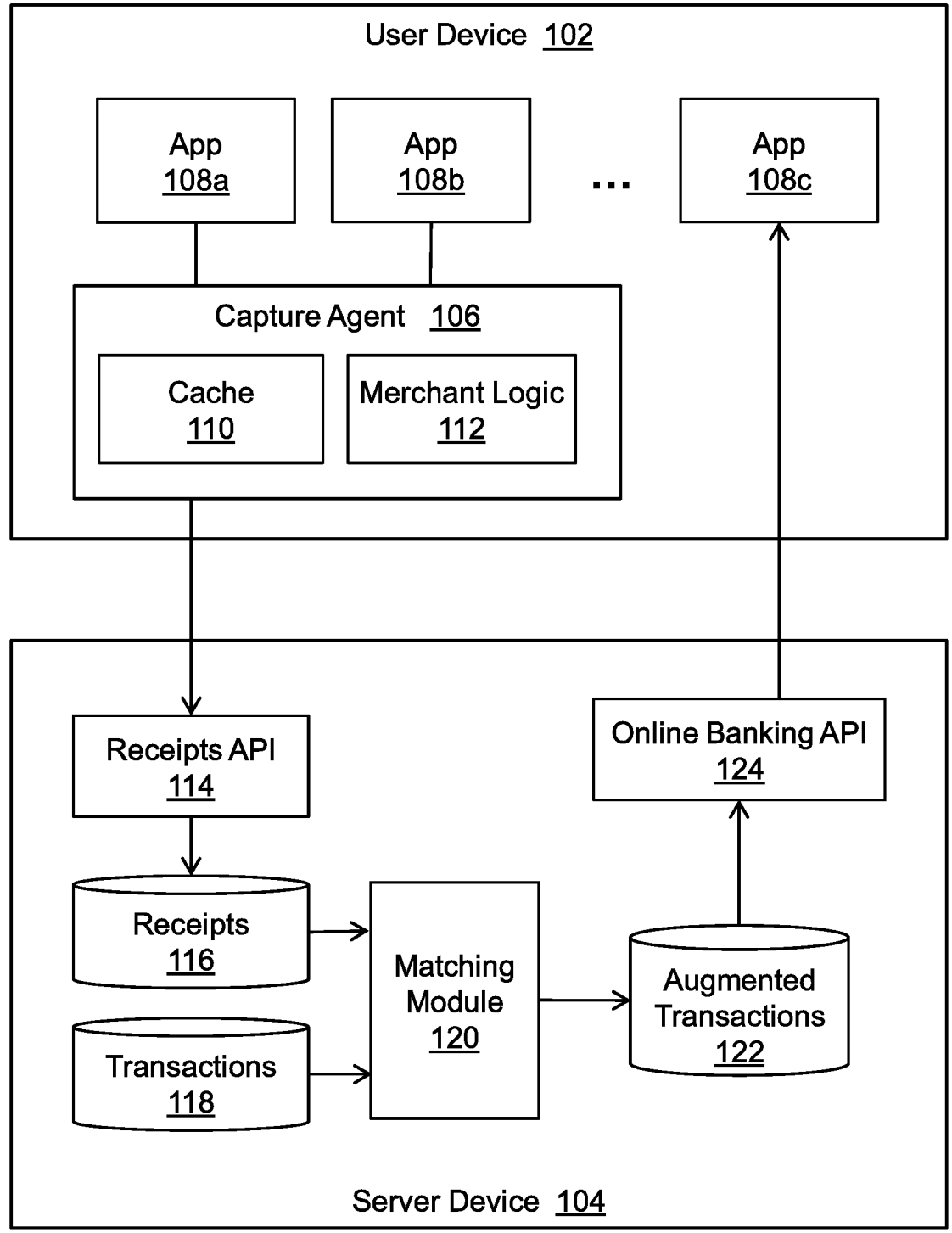
FIG. 1 depicts an exemplary system for generating transaction statements with item level data, according to embodiments of the present disclosure.

Embodiments of the present disclosure may improve the accuracy of online banking systems by augmenting transaction statements with relevant receipt information extracted from GUIs displayed on a user device. Using parsing and/or capture logic implemented in a browser extension, plug-in, or other software augmenting web browser and/or mobile application functionality, a capture agent recognizes e-commerce GUIs indicating completion of a transaction and extracts receipt information from relevant GUIs. Receipt information includes item level data describing, for example, products purchased in a transaction and the amount paid for each product. Additional item level data including services purchased in conjunction with one or more products (e.g., warranty, maintenance, replacement services, etc.), the vendor selling the product, the shipping address for the product, the shipping costs for the product, and/or taxes charged for the product may also be included in receipt information. Receipt information may list item level data for each product included in a receipt. Additionally, one or more fields included in receipt information (e.g., vendor, price, tax, shipping address, shipping costs, etc.) may be aggregated for two or more items included in a receipt.

Receipt information included in e-commerce GUIs may be parsed into text, pictures, and other unformatted content that may be associated with transaction statements and other metadata. Additionally, receipt information may be captured as merchant content comprising elements (e.g., stylizing, formatting, interactive, etc. elements) of web pages and/or mobile applications (e.g., HTML, cascade style sheets (CSS), JavaScript, etc. elements for web pages and/or Objective-C, Swift, Android, etc. elements for mobile apps) that include receipt information. Merchant content may then be integrated into web page elements and/or mobile application elements of an online banking application to display the receipt information included in merchant content as structured data. Merchant content, including web page elements having receipt information and/or mobile app GUI elements having receipt information, facilitates more rapid integration of receipt information into transaction statements and other online banking application GUIs.

In some embodiments, post capture, receipt information can be stored on a server device along with transaction statements. Matching logic then associates receipt information with a transaction data to generate augmented transaction data that may be displayed in an online bank application transaction statement including item level data for products purchased in a transaction. In some embodiments, matching logic associates receipt information with a transaction using purchase total amount, merchant, customer id, account id, time period, and other metadata fields included in both receipts and transaction statements. Associations made between receipt information and transactions can then be recorded in a database and used to provide additional functionality within an online banking system. For example, the receipt information can be used to verify the transaction amounts listed in a transaction statement are accurate. In various embodiments, item level data included in receipt information (e.g., item description, item pictures, related services, and vendors) is also displayed with transaction statements shown in an online banking transaction history. Augmenting transaction statements with item level receipt information makes transaction statements searchable by fields included in item level receipt information, for example, item name, vendor, warranty, and/or purchase date.

Providers of online banking services may also use transaction data augmented by receipt information to build more detailed customer profiles. Knowledge of items customers purchase, how frequently items are purchased, vendors customers purchase from, additional services purchased with items, and other item level purchase data provides service providers more insight into their customers. Promotions and other marketing activities may then be optimized using information gleaned from receipt information and transaction statements included in customer profiles.

FIG. 1 depicts an exemplary system 100 for providing augmented transaction statements, according to embodiments of the present disclosure. In some embodiments, the system can capture receipt information, associate receipt information with transaction data, and augment transaction statements displayed in an online banking application with item level receipt information. As shown in FIG. 1, an exemplary system 100 may include one or more user devices 102 communicatively coupled to one or more server devices 104. A user device 102 can include, for example, a mobile device, such as, for example, personal digital assistant (PDA), tablet computer and/or electronic reader (e.g., iPad™, Kindle Fire™, Playbook™, Touchpad™, etc.), wearable device (e.g., Google Glass™, Samsung Galaxy Gear Smartwatch™, and/or Apple Watch™) telephony device, smartphone (e.g., an iPhone™ from Apple® or other smartphones running the Android® operating system), camera, music playing device (e.g., iPod™, etc.), any device running Microsoft's Windows® Mobile operating system, laptops, desktop computers, televisions, set-top-box devices, and the like. A user device 102 may be any device capable of communicating via, for example. Bluetooth™ technology, NFC technology. WiFi Direct technology, and/or the like and execute various functions to transmit and receive application data, for example, online banking application data (e.g., card number, account type, account balance, account limits, budget data, recent transactions, and/or the like) and e-commerce application data (e.g., product name, product description, product image, price, shopping cart contents, checkout information, vendors, shipping information, billing information, payment information, order number, purchase date, and/or the like). An exemplary user device 102 implementation is shown in detail below in FIG. 6. An exemplary server device 104 implementation is shown in detail below in FIG. 5.

As shown in FIG. 1, each user device 102 and server device 104 may include various components. As used herein, the term "component" may be understood to refer to computer executable software, firmware, hardware, and/or various combinations thereof. It is noted that where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, an illustrative user device 102 may include, for example, capture agent 106, one or more e-commerce 108a, 108b applications, and one or more online banking 108c applications.

In various embodiments, the capture agent 106 may be implemented as a browser extension, plug-in, or other software augmenting web browser functionality. For example, a browser extension incorporated into a web browser or mobile web browser such as a mobile version of Google Chrome™, Mozilla Firefox™, or Apple Safari™. Additionally, the capture agent 106 may be implemented as a plug-in and/or extension of a mobile application (e.g., an e-commerce application). The capture agent 106 may also be implemented as a stand-alone application that runs concurrently with a web browser, mobile web browser, or mobile application. In various embodiments, the capture agent 106 runs concurrently with a web browser application and/or mobile application as a plug-in. As users browse and purchase items during a browser session within a web browser and/or an application session within a mobile application, the capture agent 106 may parse one or more GUIs displayed during a session and capture receipt information from one or more relevant GUIs.

In various embodiments, users may download the browser extension, plug-in, or other capture agent 106 implementation from a server device 104. A link for downloading the capture agent 106 may be provided in an online banking application 108c, online banking system webpage, mobile app store, email message, text, message, push notification, web page link, or any other web or mobile messaging technique. To activate the capture agent 106 on a user device 102, a user may authenticate an online banking account to use with the capture agent 106 and/or otherwise activate the capture agent 106 in a configurations or settings file for a browser application, online banking application 108c, and/or an c-commerce application 108a.

In various embodiments, an e-commerce application 108a includes web pages and/or mobile applications having an e-commerce component (i.e., interactive payment processing logic or equivalent functionality for buying and or selling goods and/or services). An e-commerce application 108a includes web pages displayed in a browser application and/or mobile applications. For example, an e-commerce application 108a may include webpage and/or mobile app versions of online marketplaces (e.g., Amazon, Ebay, Alibaba, Etsy, etc.), online stores (e.g., Apple's online store, Nike's online store, Macy's online store, etc.), travel websites (e.g., American Airlines' online store, Marriot's online store, etc.), financial services websites (e.g., Capital One's loan repayment portal. Chase's credit card payment portal, etc.), and any other website or mobile application having an e-commerce component for buying and/or selling goods and/or services. As defined herein. "e-commerce GUIs" refer to web pages and mobile application GUIs having an e-commerce component.

In various embodiments, the capture agent 106 provides receipt information to a server device 104 for matching with transaction statements and integration into an online banking application. As shown in FIG. 1, a capture agent 106 may include a cache 110 and merchant specific logic 112. To help the capture agent 106 parse and capture data from the various GUIs displayed in an e-commerce application 108a, merchant logic 112 can include instructions for identifying a merchant associated with e-commerce GUIs displayed on a user device 102. In various implementations, merchant logic 112 includes merchant specific instructions for parsing e-commerce GUIs. Exemplary merchant specific instructions may include one or more identifying features (e.g., document object model (DOM) elements, text indicators, etc.) of GUIs including receipt information displayed in an e-commerce application 108a associated with a particular merchant. In various embodiments, merchant logic 112 may be implemented as one or more folders of configuration files, separate libraries, or one or more state machines, wherein each respective configuration file, library, or state corresponds to a different merchant associated with an e-commerce application.

Generally. DOMs are structured versions of elements comprising web pages and/or mobile app GUIs. DOMs organize the elements of a document underlying a GUI into a set of structured objects that provides a platform and language neutral interface for dynamically accessing and manipulating the content, structure, and style of a GUI. Mobile and web development frameworks typically generate DOM representations of specific GUIs using an application programming interface (e.g., the DOM Objective-C API for iOS applications, the HTML DOM API for web pages, etc.). In various embodiments, a GUI may be first represented as a document (e.g., XML. HTML. JSON) before generating a DOM representation for the GUI. In various embodiments, the capture agent 106 may parse one or more GUIs by accessing a DOM and reading the DOM elements to search for one or more identifying features of GUIs including receipt information. The capture agent 106 may also recognize one or more merchants associated with a particular GUI from parsing DOM elements generated for the GUI.

In various embodiments, merchant logic 112 can include parsing instructions for identifying GUIs including receipt information. Parsing instructions included in merchant logic 112 may be implemented as one or more recognition model(s) that fetch a DOM for a GUI; search the DOM for elements corresponding to receipt information identifying features; and store DOMs including receipt information in memory for further processing. Merchant logic 112 may include one or more generalizable recognition model(s) having receipt information recognition functionality extensible to most and/or all GUIs included in e-commerce applications 108a, 108b, . . . , 108n.

In various embodiments, merchant logic 112 can include merchant specific parsing instructions for identifying GUIs including receipt information. Merchant specific parsing instructions included in merchant logic 112 may be implemented as one or more merchant specific recognition model(s) that fetch a DOM for a GUI; search the DOM for elements (e.g., tags, content, style, etc.) identifying one or more merchants associated with the GUI; retrieve (i.e., from a configuration file) receipt information identifying features for GUIs associated with the one or more merchants; search the DOM for elements corresponding to merchant specific receipt information identifying features; and store DOMs and/or DOM elements including receipt information in memory for further processing. For example, merchant logic 112 may recognize Amazon GUIs with DOMs having a first heading tag incorporating the text "Item" (e.g., <h> Item <h>) as including receipt information. Similarly, merchant logic 112 may recognize American Airlines GUIs with DOMs having a clickable button tag incorporating the text "Purchase" (e.g., <button type="button">Purchase<button>) as including receipt information.

Merchant logic 112 may also comprise instructions for capturing receipt information included in e-commerce GUIs. In various embodiments, merchant logic 112 may be implemented as a state machine that executes parsing instructions in a parsing state and capture instructions in a capture state. Processing raw (i.e., unparsed) GUIs and/or DOMs may trigger parsing state functions, whereas processing previously parsed GUIs and/or DOMs may trigger capture state functions. Merchant logic 112 may include one or more generalizable capture models having receipt information capture functionality extensible to most and/or all e-commerce applications 108a, 108b, . . . , 108n. Additionally, capture models included in merchant logic 112 may be specific to one or more merchants associated with an e-commerce application 108a.

For example, merchant logic 112 having one or more merchant specific capture model(s) may instruct the capture agent 106 to capture GUI elements from a portion of an Ebay GUI recognized by a recognition model as having receipt information. In various embodiments, to capture receipt information, merchant logic 112 may access an e-commerce GUI DOM in memory; locate a receipt information identifying feature in the DOM elements (e.g., a clickable button labeled "Proceed to Checkout"-<button type="button">Proceed to Checkout<button>—appearing in an upper portion of the GUI); and extract relevant receipt information (e.g., product name, price, product description, picture of the item, etc.) from the DOM. Similarly, to capture receipt information, merchant logic 112 may instruct the capture agent 106 to capture all DOM elements below the first division on Ticketmaster GUIs having a DOM including a first heading tag incorporating the text "Receipt" (e.g., <h1> Receipt <h1>).

The capture agent 106 may store DOMs and/or DOM elements for e-commerce GUIs including receipt information in a cache 110 and/or other memory or storage. In various embodiments, receipt information may be stored as a collection of DOM and/or GUI elements (e.g., tags, content, style, etc.) to preserve the style, format, interactive features, and/or other components of the captured receipt information for rapid integration into other web pages and/or mobile app GUIs (e.g., online banking GUIs). Additionally or alternatively, content (e.g., text, images, and other non-stylistic, non-interactive, non-formatting information) included in captured receipt information may be extracted from DOM and/or GUI elements and stored in cache 110 or other memory and/or storage.

In various embodiments, cache 110 is a short term storage and/or memory resource. Within the capture agent 106, cache 110 may provide short term storage for DOMs of relevant GUIs and/or receipt information collected from GUI screens. Before the capture agent 106 recognizes GUIs (e.g., a receipt GUI). DOM elements (e.g., a receipt heading, complete purchase button, etc.), and/or text (e.g., "thank you for your purchase", "total", "subtotal", etc.) indicating completion of a transaction, receipt information including DOM & GUI elements may be stored in cache 110. Once the capture agent detects a completed transaction, receipt information stored in cache is transferred to a server device 104. If no completed transaction is detected during a browser and/or application session, receipt information held in cache 110 may be cleared. Cache 110 may also be cleared if a user navigates away from an order confirmation and/or checkout GUI without completing a purchase.

In various embodiments, receipt information is transmitted from a capture agent 106 of a user device 102 to a server device 104 for matching with transaction statements. A server device 104 can include a receipts API 114 for receiving and processing receipt information from the capture agent 106. The server device 104 may also include a matching module 120 for associating receipt information recorded in a receipts database 116 with transaction statements recorded in a transactions database 118. The matching module 120 may generate one or more augmented transactions including item level data for transaction records. Augmented transactions may be recorded in an augmented transactions database 122 and provided to an online banking API 124 for distribution to an online banking application 108c.

In various embodiments, the receipts API 114 receives receipt information captured by the capture agent 106. The receipts API 114 may request receipt information from the capture agent automatically, for example, on a periodic schedule or in response to a message from a capture agent indicating new receipt information is available. Additionally or alternatively, the capture agent 106 may dynamically push new receipt information to the receipts API 114 as new receipt information becomes available. The capture agent 106 may also push batches of receipt information collected, for example, during a browser and/or mobile app session and/or over a specific period of time to the receipts API 114 for further processing. Receipt information received from the capture agent 106 may be compiled into a receipt record by the receipt API 114. In various embodiments, the receipts API 114 returns a receipt record in response to receipt information queries received from a matching module 120.

Receipt records may include a defined subset (e.g., essential item level data fields) and/or all receipt information for a particular transaction. Receipt records may be recorded in a receipts database 116 as a document, file, folder, data object, data stream, or other machine readable format for transferring information.

The receipts API 114 may include libraries, methods, and/or functionality for cleaning receipts information and/or receipts records. Additional functionality provided by the receipts API may index, group, extract, or otherwise manipulate one or more fields included in receipt information and/or receipts records. In various embodiments, the receipts API 114 may extract one or more item level data fields (e.g., item name, item description, item price, item vendor, item picture) from receipt information. The one or more item level data fields may be grouped with other relevant and/or similar fields to form a receipt record. In various embodiments, receipt records and other groups of extracted fields may be complied in data file or document (e.g., JSON, XML, HTML, YAML, or other file format) and/or recorded in the receipts database 116 and/or other memory or storage. The receipts database 116 may store receipt records and other receipt information in various ways including, for example, as a flat file, indexed file, hierarchical database, relational database, and/or any other storage mechanism.

In various embodiments, cleaning functionality provided by the receipts API 114 may process receipt information to remove duplicate entries, resolve abnormalities in data structure or data content, convert receipt information into an interoperable state, and perform other cleaning operations that improve the processing efficiency and/or interoperability of other operations performed using receipt information. Other libraries accessible through the receipts API 114 may provide functionality for indexing receipt information on, for example, e-commerce platform, user, vendor, item type, price, transaction date, and/or text or other metadata fields included in receipt information. Indexed receipt information and/or receipt records may enable other services, applications, and components (e.g., the matching module 120) to search the receipts database 116 using queries comprising plain text and/or other indexed information.

To generate augmented transactions, receipt information included in the receipts database 116 may be combined with transaction data included in a transactions database 118. In various embodiments, transaction data includes an amount in fiat currency (e.g., US Dollars, Chinese Renminbi, etc.) and/or other transaction metadata (e.g., account number, customer id, credit card number, transaction number, billing address, item subtotal amount, discounts, taxes, banking institution, and other information relating to a financial transaction) collected by financial service provider. Transaction data may be collected from a computer system (e.g., a bank computer network) operated by merchants, payment processors, and other financial intermediaries. In various embodiments, transaction statements may be recorded in a transactions database 118 on a server device 104. In various embodiments, the transactions database 118 may store transaction statements in various ways including, for example, as a flat file, indexed file, hierarchical database, relational database, and/or any other storage mechanism.

A matching module 120 includes instructions for matching receipt information (e.g., a receipt record) included in a receipts database 116 with its corresponding transaction included in a transactions database 118. To facilitate matching, a transaction database 118 and/or receipts database 116 may be unique for each user account authorizing, downloading, and/or using the capture agent 106. In these examples, a server device 104 may include many database instances within the receipt database 116 and/or transactions database 118 with each database instance having receipt information and/or transaction statements unique to a specific user account. Additionally or alternatively, receipt information and/or transaction statements may include a user account identifier distinguishing transactions and/or receipts generated by each user account.

To match receipts with transactions, the matching module 120 may load a plurality of transactions into a transactions queue (e.g., a streaming transactions queue including transaction amounts and associated metadata); receive receipt information (e.g., receipt records from a receipts API); search transactions queue for transactions matching one or more metadata fields (e.g., customer id, account id, merchant, transaction date, etc.) included in the receipt information; locate the purchase amount in the receipt; and match the purchase amount with a transaction amount included in the subset of transactions. In various embodiments, the matching module 120 may first try to find and an exact match between receipt information and transaction data. For example, a receipt total amount of $41.43 for an Amazon purchase made by customer X on June 6th may be exactly matched with a transaction record of withdraw $41.43 from customer X's account on June 6th at the request of Amazon.

In various embodiments, if the matching module 120 is unable to find an exact match, receipts and transactions may be matched using a threshold (i.e., fuzzy and/or approximate) match. In various implementations, the matching module 120 performs a threshold match by matching receipts with transactions having similar but not identical values for one or more data fields. For example, the receipt total amount of $41.43 for an Amazon purchase made by customer X on June 6th may be threshold matched with withdraw of $40.57 from customer X's account on June 7th at the request of Amazon. The receipt total amount (e.g., $41.43) is within the amount matching threshold (e.g., +/−1 dollar, +/−3 percent of total amount, etc.) and the receipt date (e.g., June 6th) is within the time period matching threshold (e.g., +/−1 day, +/−1 week, etc.), therefore the receipt is still matched with the transaction even though the receipt information does not exactly match with the transaction data. Matching thresholds may be different and/or the same for each metadata filed included in receipt information and/or transaction data. In various embodiments, match thresholds may be independently configurable and/or specific to one or more merchants associated with an e-commerce application.

In various implementations, the matching module 120 may match receipt information to transaction data by combining two or more transactions and/or two or more receipts. Some merchants may combine purchases made within a certain time period into one transaction to avoid transaction and/or interchange fees. Logic for aggregating and matching purchase amounts included in multiple receipts can help locate transaction data for receipt information that does not have an exact or threshold match. To match multiple receipts to a transaction, the matching module 120 may add up individual purchase amounts included in receipts having the same customer and/or vendor generated within a defined time period (e.g., 1 day, 5 days, 1 week, etc.). Receipt information included in receipt records having total purchase amounts adding up to a transaction amount is then matched with transaction data including the transaction amount.

Some merchants may split payment for items included in a single purchase into multiple transaction amounts. For example, some merchants divide multiple tickets bought in a single purchase into multiple transactions (e.g., one transaction per ticket). Other merchants charge customers for items when the items ship so that all items shipping on the same day are included in the same transaction but items bought in a single purchase having a different shipping date are included in a different transaction. Logic for aggregating and matching transaction amounts included in multiple transactions can help locate receipt information for transaction data that does not have an exact or threshold match.

To match multiple transactions to a receipt record, the matching module 120 may add up individual transaction amounts included in a transaction queue containing transactions having the same customer and/or vendor posted within a defined time period (e.g., 1 day, 5 days, 1 week, etc.). Transaction data included in transaction records having transaction amounts adding up to a total purchase amount included in a receipt record is then matched with receipt information included in the receipt record. Transaction records having transaction amounts summing to a total purchase amount may be close in sequence (i.e., posted sequentially or nearly sequentially) with the transaction records on a customer's transaction statement. Additionally, aggregated transaction records may not be posted close in sequence with at least a few transactions posted between transaction records displayed on a customer's account.

In various embodiments, matching logic implemented in the matching module 120 may estimate one or more metadata fields to facilitate matching transaction data and receipt information. For example, if the tax amount and/or shipping cost is not itemized in the receipt or not included in receipt information, estimates for tax and/or shipping may be calculated to match multiple transactions for items bought in a single purchase to its corresponding receipt information. Taxes on online sales vary by state and country, therefore the matching module 120 incorporates logic for estimating taxes using tax rates local to the location of the shipping address (e.g., city, state, zip code, etc.) for the items included in receipts having multiple transactions.

For example, a receipt record may include 1 item with a pretax value of $20.99 having a shipping address in California and 1 item with a pretax value of $30.99 having a shipping address in New York. The receipt record lists a total tax value of $4.15 and a shipping cost of $7.50. If the items are separated into two transactions, the matching module 120 may use a known New York tax rate of 10% to estimate the portion of the tax amount on the item shipping to New York as $3.10 and a known California tax rate of 5% to estimate the portion of the tax amount on the item shipping to California as $1.05. The matching module 120 may also scale the shipping cost on the New York bound item to $3.50 and the shipping cost on the California bound item to $4.00 because the vendor is located in Ohio (i.e., a closer distance to New York). The matching module 120 may use the estimated tax and shipping costs to determine the purchase amount for the New York item is $37.59 and the purchase amount for the California item is $26.04. To associate receipt information with transaction data, the matching module 120 then searches a transactions queue for two transactions having transaction amounts that exactly or threshold match the estimated purchase amounts.

In various embodiments, merchant logic 112 and/or the receipts API 114 may also include instructions and/or functionality for estimating tax and shipping costs for items included in receipt information. Estimated tax and shipping costs determined by merchant logic 112 and/or the receipts API 114 may be based on local tax rules and/or shipping distance associated with a shipping address (e.g., city, state, zip code, etc.) for each item included in a receipt. Tax and shipping costs may also be estimated by evenly portioning tax and shipping costs by item price (i.e., more expensive items have proportionally higher taxes and shipping costs and cheaper items have proportionally lower taxes and shipping costs). Estimated tax and shipping costs for items may be recorded in a receipts database as receipt information and/or included in a receipt record.

Using associations between receipts and transaction records, the matching module 120 may generate augmented transactions combining item level receipt information (e.g., product name, product description, vendor, product picture, etc.) with transaction records. Augmented transactions including transaction records augmented with item level receipt information may be stored in an augmented transactions database 122 on a server device 104. In various embodiments, the augmented transactions database 122 may store transaction statements in various ways including, for example, as a flat file, indexed file, hierarchical database, relational database, and/or any other storage mechanism.

As new transaction records are posted to a transaction statement included in an online banking application 108c, an online banking API 124 may dynamically enhance transaction statements by appending item level data to the transactions. In various embodiments, an online banking API 124 provides functionality for detecting a new transaction for a user account; retrieving item level data associated with the new transaction: and displaying the item level data as structured data in online banking application 108c GUI. In various embodiments, item level data for transaction records may include merchant content (e.g., web page elements, such as, HTML, CSS and/or JavaScript elements, incorporating receipt information and/or mobile app elements, for example, Objective-C. Swift, and/or Android elements including receipt information) captured from an e-commerce application 108a. Item level data may also include unformatted text, pictures, and other receipt information, optionally associated with transaction data, user id, account id, and/or other metadata. An online banking API 124 may incorporate the captured merchant content and/or other receipt information into a transaction statement, transaction history, and/or other GUI included in a mobile and/or web version of an online banking application 108c.

In various embodiments, the merchant content includes receipt information (e.g., item name, item description, item price, item vendor, item picture, etc.) having web and/or mobile application formatting, style, and/or interactive elements. The online banking API 124 may incorporate merchant content and/or other receipt information into a web and/or mobile version of an online banking application (e.g., an online banking mobile application) as an expandable feature of a transaction statement, transaction history, and/or other GUI. To view the merchant content and/or other receipt information, a user may select a transaction record and/or other structure (e.g., arrow, button, etc.) proximate to the transaction record to reveal merchant content and/or other receipt information.

Merchant content may be saved in an augmented transactions database 122 and/or associated with a transaction record in advance of display. Additionally, merchant content may be stored in a receipt database and located by an online banking API 124 using an association between a receipt and a transaction stored in an augmented transactions database 122. Saving merchant content in a format incorporating web page and/or mobile application elements may allow one or more integration libraries included in an online banking API 124 to dynamically and/or automatically update transaction statements and other online banking GUIs with stylized, interactive, formatted, and/or accurate item level data without an additional step of encoding receipt information with web elements and/or mobile application elements. Removing this encoding step increases the efficiency and scalability of integrating item level data captured from e-commerce applications with transaction statements provided by an online banking application 108*c*.

FIGS. 2A-D depict illustrative GUIs 200, 220, 240, 260 associated with an exemplary e-commerce application 108*a* as they are presented on a user device 102. In website implementations of e-commerce applications 108*a*, each GUI may be represented as a DOM (e.g., an HTML DOM) created by a web browser application. In mobile application implementations of commerce applications 108*a*, each GUI may be represented as a document (e.g., XML. HTML. JSON, etc.); DOM (e.g., HTML5, CSS3 DOM); virtual DOM (e.g., VDOM generated by a JavaScript library such as React); tree data structure; or other UI representation created by an object generation interface native to iOS (e.g., DOM Objective-C API) and/or Android (e.g., DOMImplementation method i.e., "DOMImplementation.createHTML-Document( )"), and/or cross compatible with multiple mobile operating systems. One exemplary layout for each GUI is described below. GUIs having different content, layouts, styling, interactive features, and other GUI components are possible.

Figure 2A:
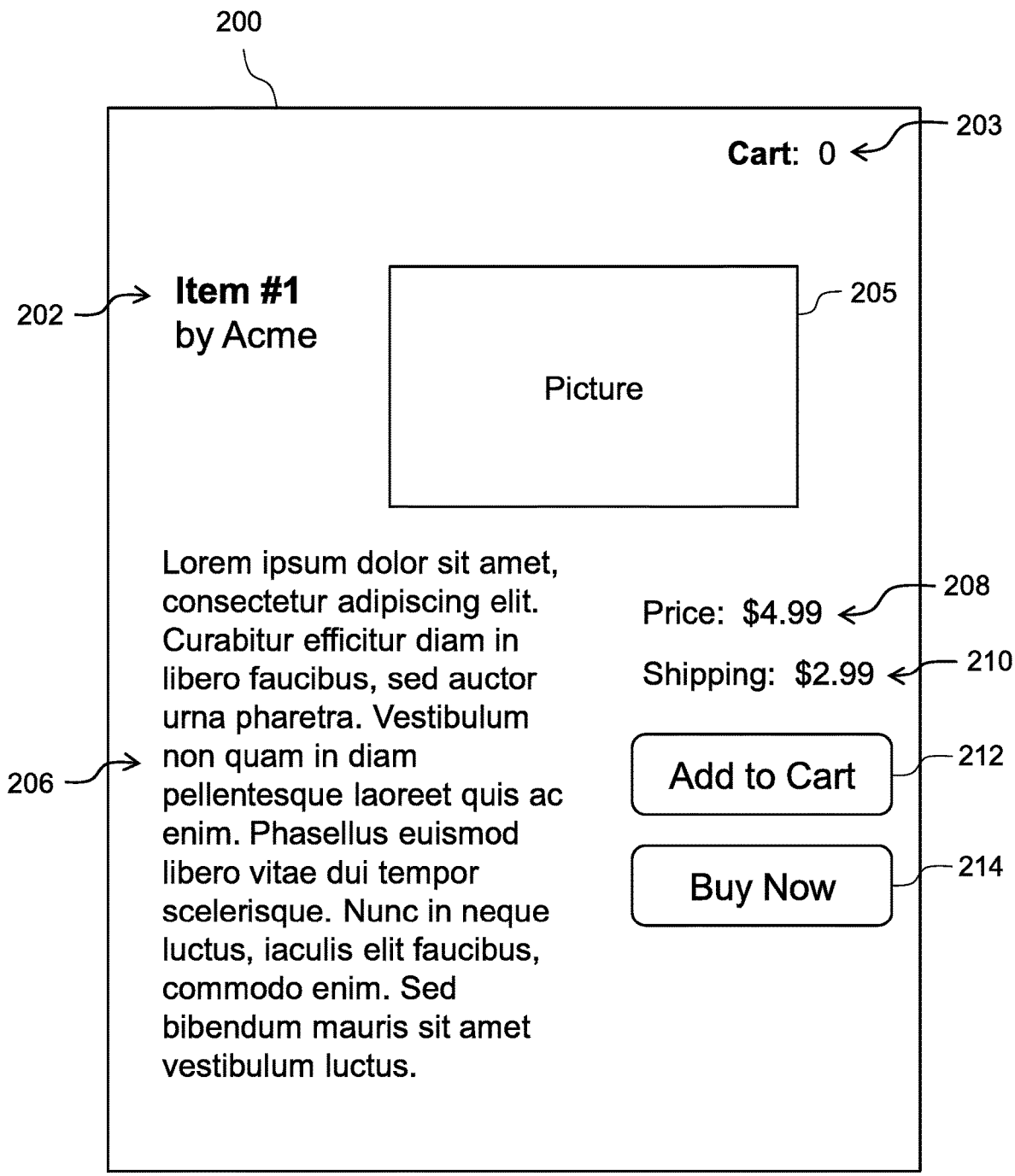

FIG. 2A shows an example of a product description 200 GUI that may be displayed within an e-commerce website or application. Optionally, the product description 200 GUI includes a cart counter 203 in an upper right header portion of the GUI. The numeric counter value included in the cart counter 203 can reflect the number of items in a digital shopping cart within an e-commerce application. Product details are listed below a first division and form the body of the GUI. Exemplary product details that may be included in an illustrative product description 200 GUI comprise a product name 202 and vendor shown in the upper left portion of the GUI adjacent to a product picture 205 showing the visual appearance of a product. Optionally, a product description 206 describing, for example, product key features, product uses, product specifications, etc., is shown on the left side of the GUI just below the picture 205. Product price 208 and shipping costs 210 are shown to the right of the product description 206.

Optionally, to purchase an item, users can select an add to cart button 212 and/or click a buy now button 214 just below the product price 208 and shipping costs 210 on a lower right portion of the GUI. In various embodiments, selecting an add to cart 212 button brings users to a shopping cart 220 GUI shown in FIG. 2B. Once on the shopping cart 220 GUI, the numeric value included in the cart will increase by 1 (e.g., from 0 to 1). In various embodiments, the numeric value in the cart counter 203 increases by 1 every time a user selects an add to cart 212 button on the instant product description 200 GUI or any other product description GUIs included in the e-commerce application. Optionally, selecting a buy now 214 button bypasses the shopping cart 220 GUI and navigates to a check out 240 GUI.

One or more elements of the product description 200 GUI may be parsed and captured by the capture agent as receipt information including the item name 202 and vendor, number of items in the cart counter 203, the item description 206, the item picture 205, the price 208, and the shipping cost 210. Once a receipt 260 GUI is detected, receipt information with each item included in a shopping cart or, if the user selects the buy now button 214, appearing on a product description 200 GUI is associated with a purchase and saved in a receipts database. In various embodiments, during parsing, merchant logic may recognize the product description 200 GUI includes receipt information but is not a receipt 260 GUI confirming a transaction. Identifying features that may be included in merchant specific logic for parsing the product description 200 GUI can include the location of the product name 202 (e.g., towards the top of the page, below cart, adjacent to a picture, above a price, and shipping costs, etc.) indicating that the primary subject of the page is the product listed in the product name 202. Additionally, the add to cart 212 and buy now 214 buttons plus the absence of a receipt heading, shipping address information, billing address information, and/or a purchase total amount indicates the product description 200 GUI is not a receipt. In various embodiments, the merchant specific logic may recognize the product description 200 GUI as a page including receipt information but not a receipt. The capture agent may capture receipt information from the product description 200 GUI including merchant content comprising the product name 202, numeric value of the cart counter 203, product description 206, product price 208, shipping costs 210, and any stylistic, formatting, and or interactive elements that structure the information within the product description 200 GUI.

In various embodiments, the capture agent may store elements of the product description 200 GUI in cache; wait for a receipt 260 GUI to be displayed during the same browser and/or application session; capture elements of the receipt 260 GUI: compare the product description 200 GUI elements and the receipt 260 GUI elements; and capture any receipt information included in the product description 200 GUI elements that was not present in the receipt 260 GUI elements. For example, the picture 205 and/or product description 206 elements of the product description 200 GUI. In various embodiments, the capture agent may also capture only the receipt information included in the receipt 260 GUI elements. In these examples, capture models implemented in the merchant logic may only be executed on elements included in e-commerce application GUIs recognized as receipt 260 GUIs.

Figure 2B:
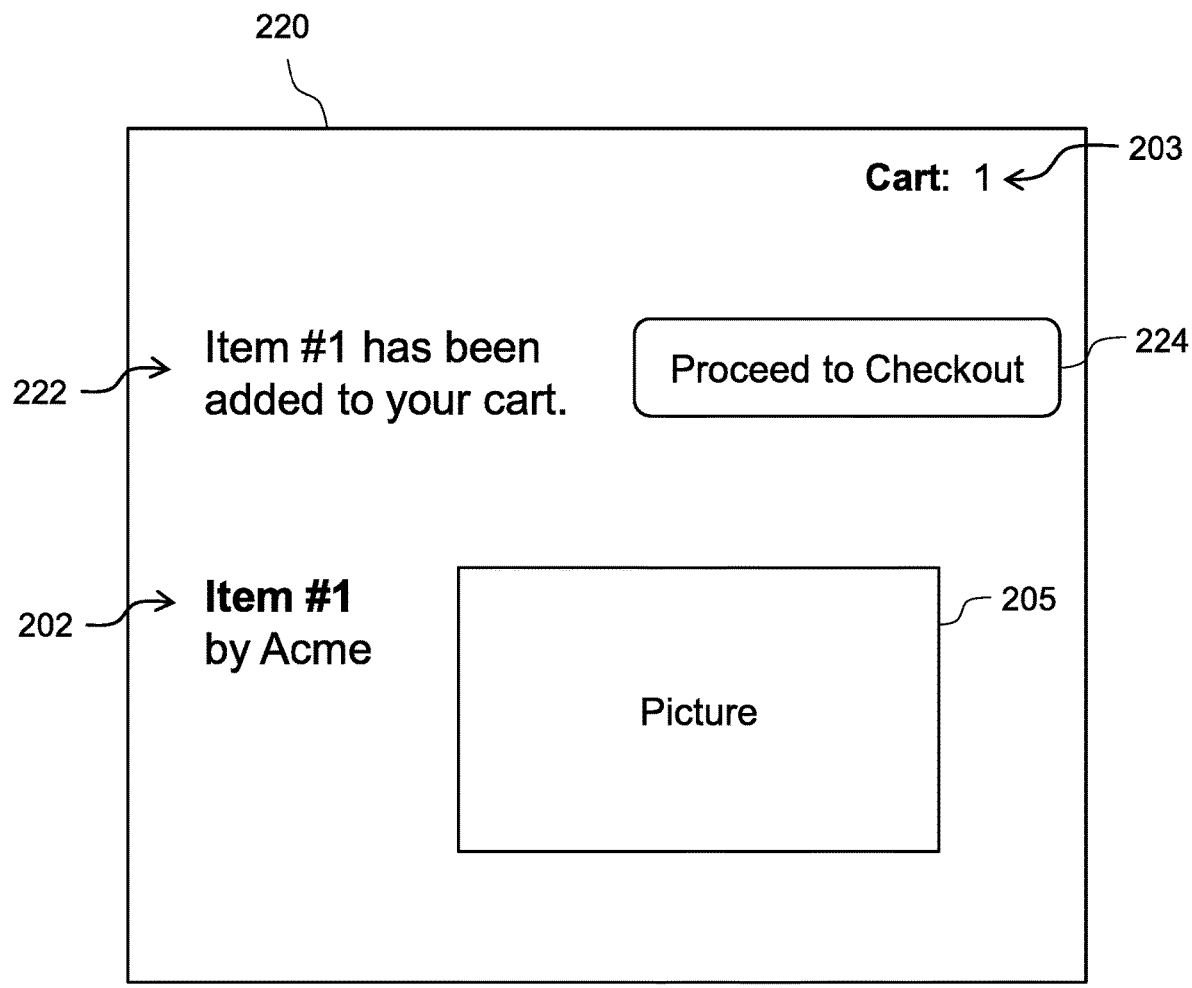

FIG. 2B illustrates an exemplary shopping cart 220 GUI that may be displayed within an e-commerce website or application. Optionally, the shopping cart 220 GUI includes a cart counter 203 in an upper right header portion of the GUI. Optionally, a confirmation message 222 and proceed to checkout 224 button are displayed just below the cart counter 203 with a product name 202 and vendor and picture 205 appearing at the bottom of the GUI. Optionally, a confirmation message 222 confirms the add to cart 212 button on the product description 200 GUI was selected to add an item to the cart. In various embodiments, the item name 202 included in the confirmation message 222 will correspond to the item name 202 listed on the product description 200 GUI. In various embodiments, selecting the add to cart 212 button navigates the user away from the product description 200 GUI to the shopping cart 220 GUI. Additionally, a user may bypass the shopping cart 220 GUI and navigate directly to the checkout 240 GUI or the receipt 260 GUI by selecting the buy now 214 button in the product description 200 GUI. Optionally, selecting the proceed to checkout 224 button will navigate to the checkout 240 GUI, for example, the GUI shown in FIG. 2C.

In various embodiments, the number of items in the shopping cart, as indicated by the numeric value included in the cart counter 203, determines how many item names 202 and pictures 205 are displayed in the shopping cart 220 GUI. For example, as shown, if only one item is in the shopping cart, only one item name 202 and picture 205 are displayed at the end of the shopping cart 220 GUI. In other examples, if three different items are in the shopping cart, three unique pairs of item names 202 and pictures 205 are displayed at the end of the shopping cart 220 GUI, wherein each item name 202 and picture 205 pair identifies a different item included in the shopping cart. Optionally, if one or more items in the shopping cart is a duplicate of an another item, the duplicated item may only be identified once in the shopping cart 220 GUI. Optionally, a numeric counter (e.g., 2×, 3×, 4×, . . . , 10×, etc.) may be listed next to an item name 202 and/or picture 205 for the one or more duplicated item(s) to indicate how many times the item is duplicated.

Figure 2C:
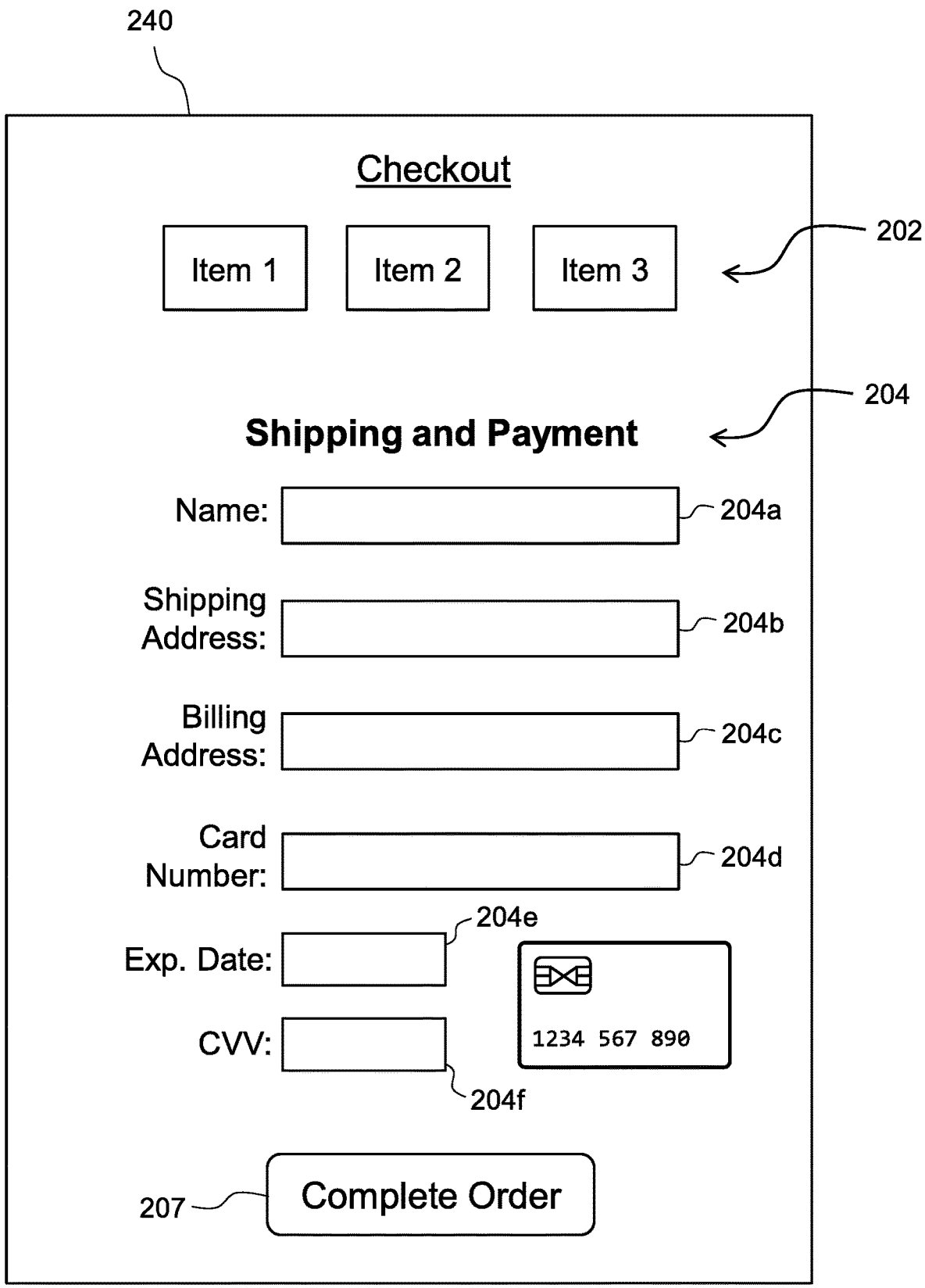

FIG. 2C illustrates an exemplary checkout 240 GUI that may be displayed within an e-commerce website or application. Optionally, the checkout 240 GUI may incorporate item names 202 for all items included in an order in a top portion of the page with shipping and payment information 204 provided below. In various embodiments, the shipping and payment information 204 may include a name 204a identifying the purchaser, a shipping address 204b to send the items included in the order, a billing address 204c corresponding to a payment card, a card number 204d identifying a payment card, an expiration date 204e restricting the use of the card, and/or a security code 204f (e.g., CVV) providing a method of verifying the authenticity of the card. Additional shipping and payment information 204 may be included in the checkout 240 GUI. In various embodiments, the capture agent parses and/or captures elements of the checkout 240 GUI including shipping and payment information 204 and item names 202 as receipt information. Additionally, the capture agent may parse the complete order 207 button to detect when a user selects the compete order 207 button. When the capture agents detects the complete order 207 button selection items included in the item names 202 buttons are associated with a purchase and receipt information collected from other GUIs (e.g., item name, item price, item vendor, item picture, etc.) may be complied as receipt information for a completed purchase.

Optionally, the checkout 240 GUI captures shipping and payment information 204 as series of text boxes arranged as a fillable form. In various embodiments, the shipping and payment information 204 may be auto populated using personal identification information (e.g., name, shipping address, billing address, etc.) stored in a web browser and/or payment card information stored in a web browser, on a user device, or collected in real time from a payment card snapshot using ocular character recognition (OCR) or other image processing techniques. After filling in the shipping and payment information 204, a user may select the complete order 207 button at the bottom of the checkout 240 GUI to complete a purchase transaction and generate a receipt, for example, as shown in the receipt 260 GUI of FIG. 2D.

FIG. 2D illustrates an exemplary receipt 260 that may be displayed within an c-commerce website or application. Optionally, the receipt 260 GUI may list order information including the date the order was placed and the order number; the item names 202 included in the purchase and the amount of each item included in the order; a shipping address of the purchaser; payment information including identification information for a payment card used to pay for the transaction; a billing address associated with the payment card; and price information including a subtotal amount listing the cost of the items before shipping and tax, a shipping and handling cost, a total amount before tax, a sales tax amount, and a final total amount listing the total cost of the order.

In various embodiments, the capture agent may recognize the receipt 260 GUI as a receipt having receipt information and confirming a transaction. The capture agent parse one or more elements of the receipt 260 GUI (e.g., the "Receipt" title at the top of the GUI) to determine it is a receipt. As described in FIG. 3, the capture agent may parse one or more GUIs until a receipt 260 GUI is recognized. After recognizing the receipt, the capture agent copies receipt information included in the receipt. In various embodiments, receipt information captured by the capture agent may include content (e.g., text, graphics, etc.) and/or stylistic, formatting, and/or interactive elements (e.g., HTML, CSS, and/or JavaScript elements for web and/or Objective-C. Swift, and Android elements for mobile) included in the e-commerce GUIs. Additionally or alternatively, the capture agent may capture only content (e.g., product names, shipping address, price information, payment information, product images etc.) independent of stylistic or interactive elements. Receipt information from captured receipts is then associated with transaction statements to provide item level data for transaction records that can be displayed in an online banking application.

Figure 3:
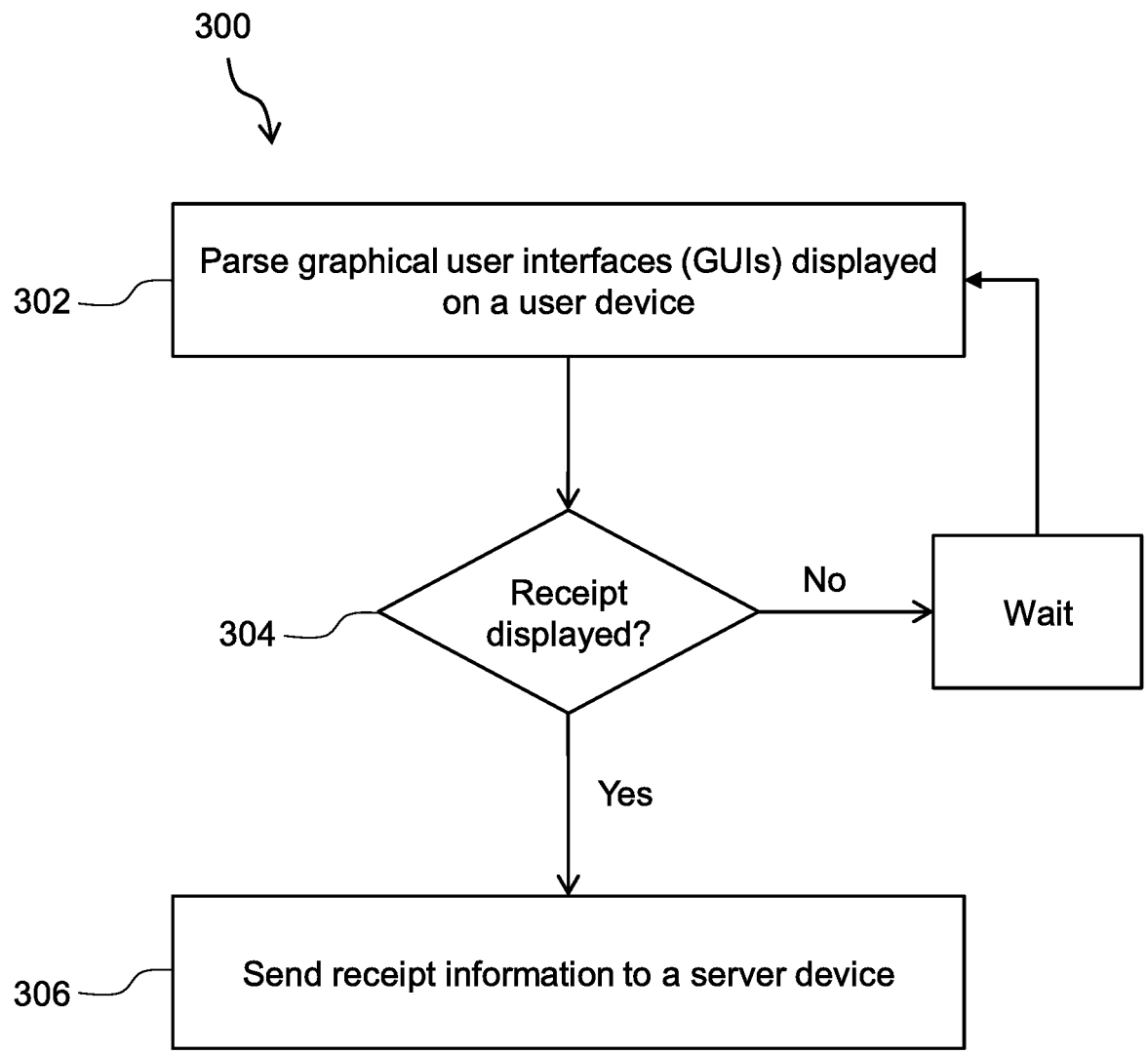
FIG. 3 is a flow diagram showing an illustrative process for capturing receipt information within an e-commerce website or application, according to embodiments of the disclosure.

FIG. 3 illustrates exemplary parsing logic 300 implemented in the capture agent 106 to capture receipt information form one or more GUIs. In various embodiments, parsing logic 300 captures receipt information from an expedited purchasing routing (e.g., a 1 click purchase routine, buy it now purchase routine, etc.). In step 302, the capture agent parses elements (e.g., DOM elements) of GUIs displayed on a user device to detect a buy now button (e.g., a one click purchase button). After detecting a one click purchase button, the capture agent captures the title of the GUI to determine if it is a checkout completion GUI, receipt GUI, or product description GUI, step 304. The capture agent may also store receipt information associating each item name included in an item button, title, and or heading with a dollar amount and a purchased item indicator. If no receipt GUI is detected the capture agent waits for the next GUI.

Once the next GUI is displayed, the capture agent parses the GUI elements to determine if the GUI is a checkout completion GUI signaling a purchase or a product description GUI indicating continued shopping. If a checkout completion GUI is displayed, the capture agent associates the previously captured receipt information (e.g., item names with associated prices) with a purchased item identifier. The capture agent may also capture the tax and shipping cost for each item or, optionally, if no tax of shipping cost is on the checkout and/or receipt GUI, calculate the tax and shipping cost. In various embodiments, the capture agent may calculate tax and shipping costs for items based on at least one of historical tax and shipping data on similar items; location specific tax rates and shipping distance dependent shipping costs; or scale a total tax and/or shipping cost captured from a receipt across all items in an order proportionally by item price. In step 306 captured receipt information is sent to a server device. If the checkout or receipt GUI is not displayed, the capture agent can refresh the cache to clear previously stored receipt information and parses the new GUI to determine what items can be instantly purchased.

In various embodiments, parsing logic 300 captures receipt information from a traditional purchasing routine (e.g., multi-check purchase routine). In step 302, the capture agent parses elements (e.g., DOM elements) of e-commerce GUIs displayed on a user device. If a capture agent detects a user is on a purchase summary GUI, elements can be parsed to capture receipt information including shipping address, shipping costs, tax, discounts, total purchase price, and/or subtotal purchase price. The captured receipt information is then stored in cache. If, at decision point 304, a capture agent recognizes a receipt GUI is displayed on the next screen, the captured receipt information can be sent to a server device, as shown in step 306. If, at decision point 304, an intermediate GUI (a checkout GUI, order confirmation GUI, etc.) is detected instead of a receipt GUI the capture agent waits for the next GUI displayed. If, at decision point 304 or after, the capture agent detects a shopping cart and/or product description GUI, receipt information captured from the previous purchase summary GUI is cleared from cache.

Parsing logic 300 implemented in the capture agent may be merchant specific. In various embodiments, parsing logic 300 incorporates merchant specific rules for recognizing GUIs and capturing receipt data from expedited and/or traditional purchasing routines. As a preliminary step for using merchant specific rules, parsing logic 300 may first include a step for recognizing a merchant associated with an e-commerce GUI displayed on a user device. In various embodiments, parsing logic 300 incorporating merchant specific rules may be implemented as one or more folders of configuration files, separate libraries, or one or more state machines, wherein each respective configuration file, library, or state includes merchant specific instructions for parsing e-commerce GUI elements.

In various embodiments, DOM elements, extracted data (e.g., unstylized, unformatted, and/or static text, graphics, etc.), and/or other components of e-commerce GUIs determined to have receipt information but not recognized as receipts may be stored in cache. In these examples, once a receipt GUI is displayed, a capture agent may capture receipt information from the receipt GUI and/or the other GUIs including receipt information stored in cache. The capture agent may then compare receipt information included in the receipt GUI and receipt information included in the other GUIs. Any receipt information found in the other GUIs, but not in the receipt GUI may be appended to captured receipt information by the capture agent before the receipt is sent to a server device. These examples build a more comprehensive dataset of receipt information by appending additional information relevant to a transaction to receipt data. More robust receipt information may generate more detailed and comprehensive item level data that can be integrated into transaction statements displayed to users through an online banking application. By augmenting additional item level receipt information to transaction statements, an online banking API may enhance transaction history, improve information accuracy, and enable item level search in an online banking application.

Figure 4:
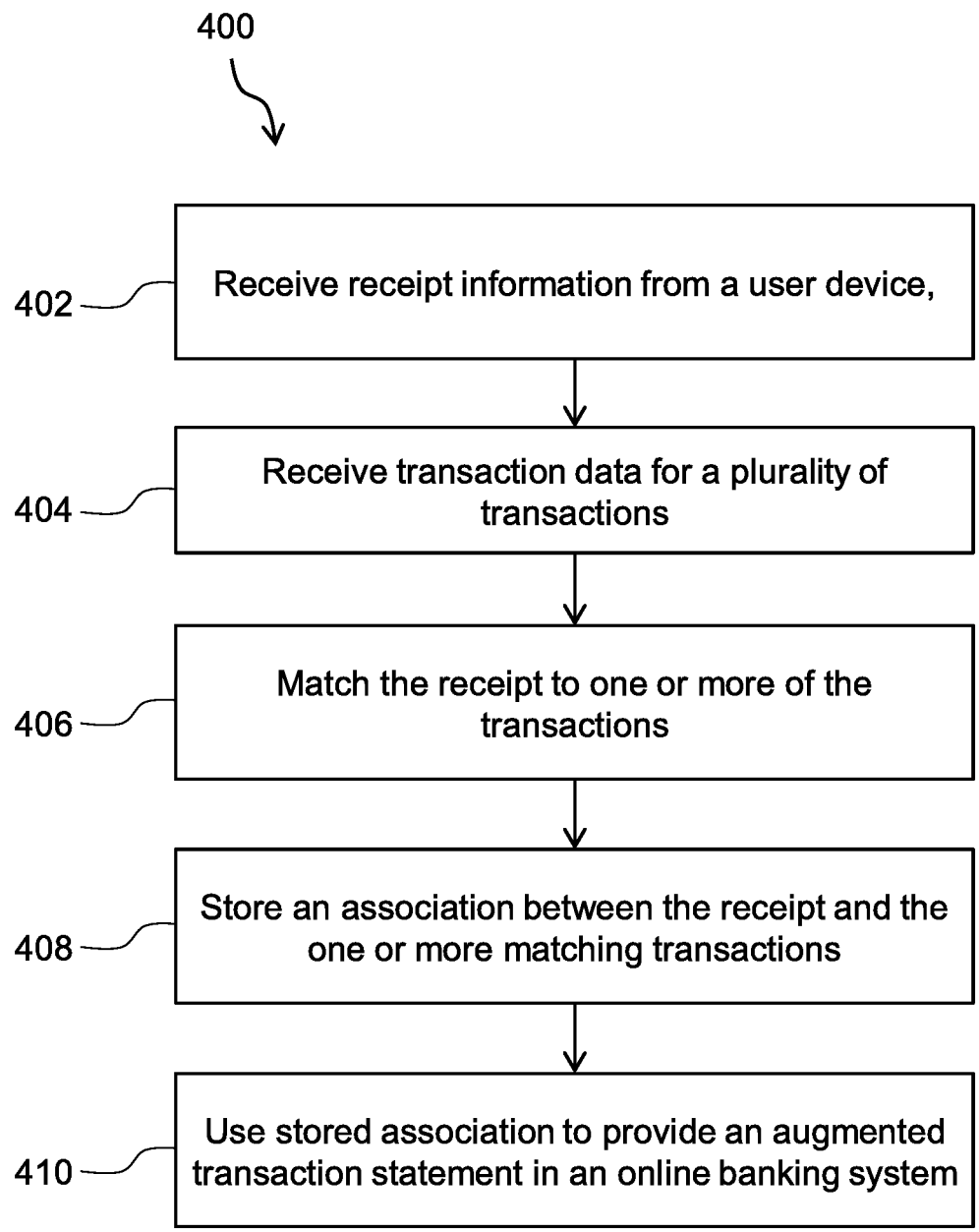
FIG. 4 is a flow diagram showing an illustrative method for generating augmented transaction statements, according to embodiments of the disclosure.

FIG. 4 is a block diagram representation of an exemplary method for creating augmented transactions 400 using receipt information and transaction data. Augmented transactions may be provided to an online banking system as a list of transaction records including item level information for one or more products and/or services purchased in a transaction. In step 402, a server device (e.g., a matching module included in a server device) receives receipt information from a user device. In various embodiments, receipt information includes item level data (price, vendor, product description, product picture) for transactions occurring in an e-commerce application (i.e., a mobile application dedicated to a particular e-commerce platform and/or a browser page within an e-commerce website).

To associate the receipt information with transaction statements, transaction data for a plurality of transactions is first received by the server device, in step 404. One or more matching routines (e.g., matching logic implemented in a matching module) then matches the receipt to one or more transactions, in step 406. In various embodiments, receipts are matched with one or more transactions using one or more data fields (e.g., customer id, account id, transaction amount, transaction date) common to the receipts and the transactions. For example, the price of one or more items included in a receipt may be compared to the value of a plurality of transactions. If an exact and/or threshold match is found between one or more receipts and one or more transactions, the transaction record(s) and the matching receipt(s) are associated. In various embodiments, one or more of the plurality of transactions and/or receipts is first narrowed to only transactions and/or receipts corresponding to a particular user or account. For example a data stream of transaction records may be organized in a transaction queue including only transaction records for a particular customer, account, merchant, and/or time period. Once the transactions and/or receipts for a user, account, merchant, and/or timer period are retrieved, a matching operation is then performed to obtain a list of account and/or customer specific associated transactions and receipts.

In various embodiments, receipts and transactions are also matched using other logic. For example, some transaction records may not match with an item purchase price in a receipt because the tax and/or shipping cost for the item is unknown. In these examples, the tax and/or shipping cost may be estimated using tax rules and/or a shipping distance associated with a shipping address found in the receipt. An updated item purchase price including an estimated tax and/or shipping amount may then be compared to a plurality of transactions to find a match. One or more transactions having a total amount equal to the updated item purchase price may then be associated with receipt information for the item. Receipt information for the item may then be combined with the matched transaction to create an augmented transaction.

As shown in FIG. 4, in step 408, associations between receipts and one or more matching transactions are stored in a server device. Associations between receipts and transactions may be stored as electronic information, files, and documents stored in various ways, including, for example, a flat file, indexed file, hierarchical database, relational database, and/or any other storage mechanism. In various embodiments, the associations between transactions and receipts are stored in a transactions database along with receipt information included in the receipts and transaction data included in the transaction.

In step 410, stored associations between transactions and receipts are used to provide an augmented transaction statement in an online banking system. In various embodiments, an online banking API may provide functionality for locating a transaction record in an augmented transaction database and retrieving receipt information for a receipt associated with the transaction. Functionality provided by the online banking API may then integrate receipt information into the associated transaction record and display the integrated receipt information along with the transaction record in an online banking application. In various embodiments, item level data including product names, prices, descriptions, and/or pictures are displayed and/or linked to transaction statements included in a transaction history GUI, account statement GUI, or other online banking GUIs generated by an online banking application.

Figure 5:
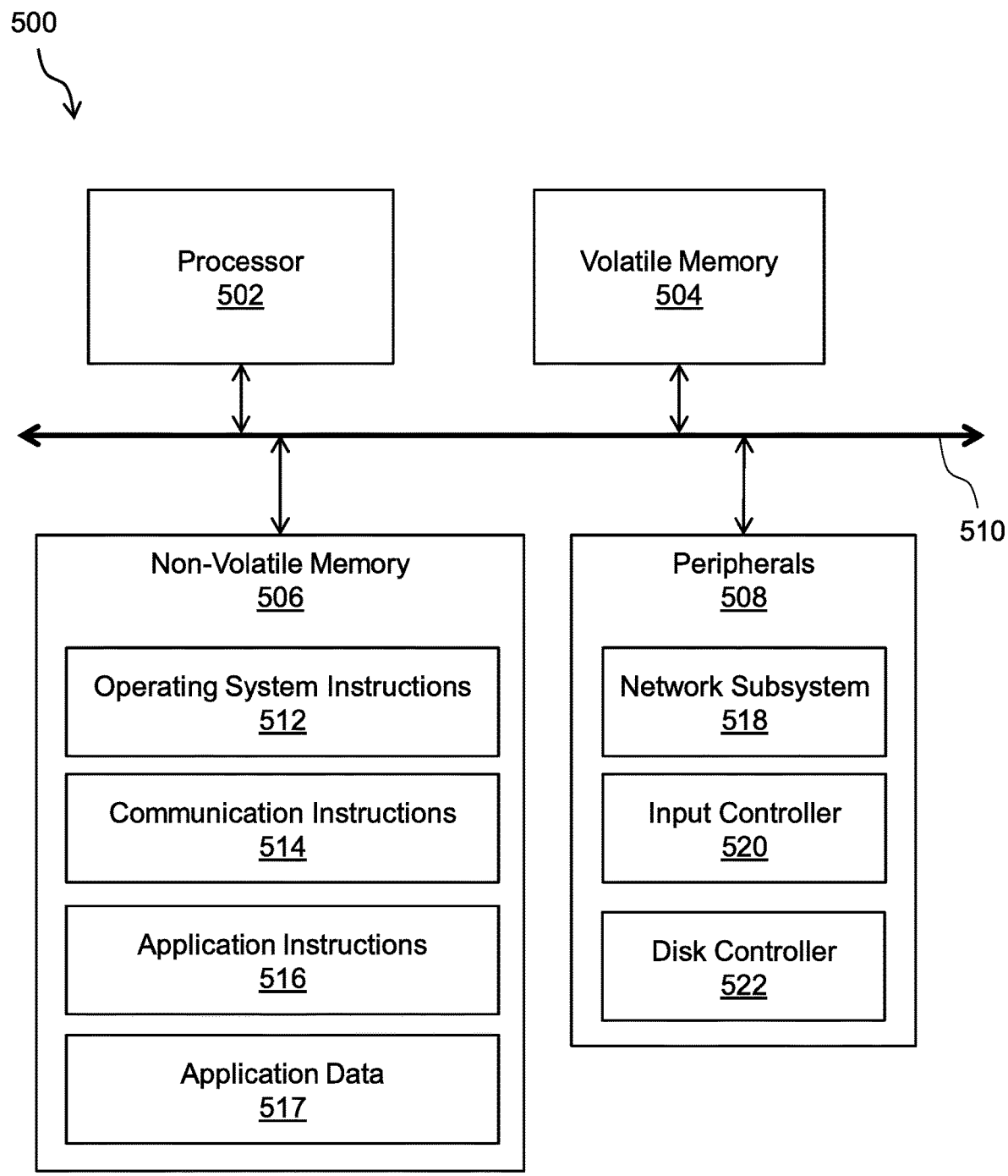
FIG. 5 is a block diagram of an illustrative server device that may be used within the system of FIG. 1, according to embodiments of the disclosure.

FIG. 5 shows an illustrative server device 500 that may implement various features and processes as described herein. The server device 500 may be implemented on any electronic device that runs software applications derived from compiled instructions, including without limitation personal computers, servers, smart phones, media players, electronic tablets, game consoles, email devices, etc. In some implementations, the server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include, by way of example, semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions 516, and application data 517. Operating system instructions 512 may include instructions for implementing an operating system (e.g., Mac OS®, Windows®, or Linux).

The operating system may be multi-user, multiprocessing, multitasking, multithreading, real-time, and the like. Communication instructions 514 may include network communications instructions, for example, software for implementing communication protocols, such as TCP/IP. HTTP, Ethernet, telephony, etc. Application instructions 516 can include instructions for associating transaction data with receipt information to generate augmented transactions and instructions for displaying item level data included in augmented transactions along with transaction statements in an online banking application as described herein. For example, application instructions 516 may include instructions for modules to retrieve and process receipt information and transaction data to generated augmented transactions described above in conjunction with FIG. 1. Application data 517 may correspond to data stored by the applications running on the server device 500. For example, Application data may 517 may include receipt information, transaction data, augmented receipt information, augmented transaction records, item level receipt information, and/or predicted values calculated using receipt information.

Peripherals 508 may be included within the server device 500 or operatively coupled to communicate with the server device 500. Peripherals 508 may include, for example, network interfaces 518, input devices 520, and storage devices 522. Network interfaces 518 may include, for example, an Ethernet or WiFi adapter for communicating over one or more wired or wireless networks. Input devices 520 may be any known input device technology, including but not limited to a keyboard (including a virtual keyboard), mouse, trackball, and touch-sensitive pad or display. Storage devices 522 may include one or more mass storage devices for storing data files; such devices include magnetic disks, such as internal hard disks and removable disks; magneto-optical disks; and optical disks.

Figure 6:
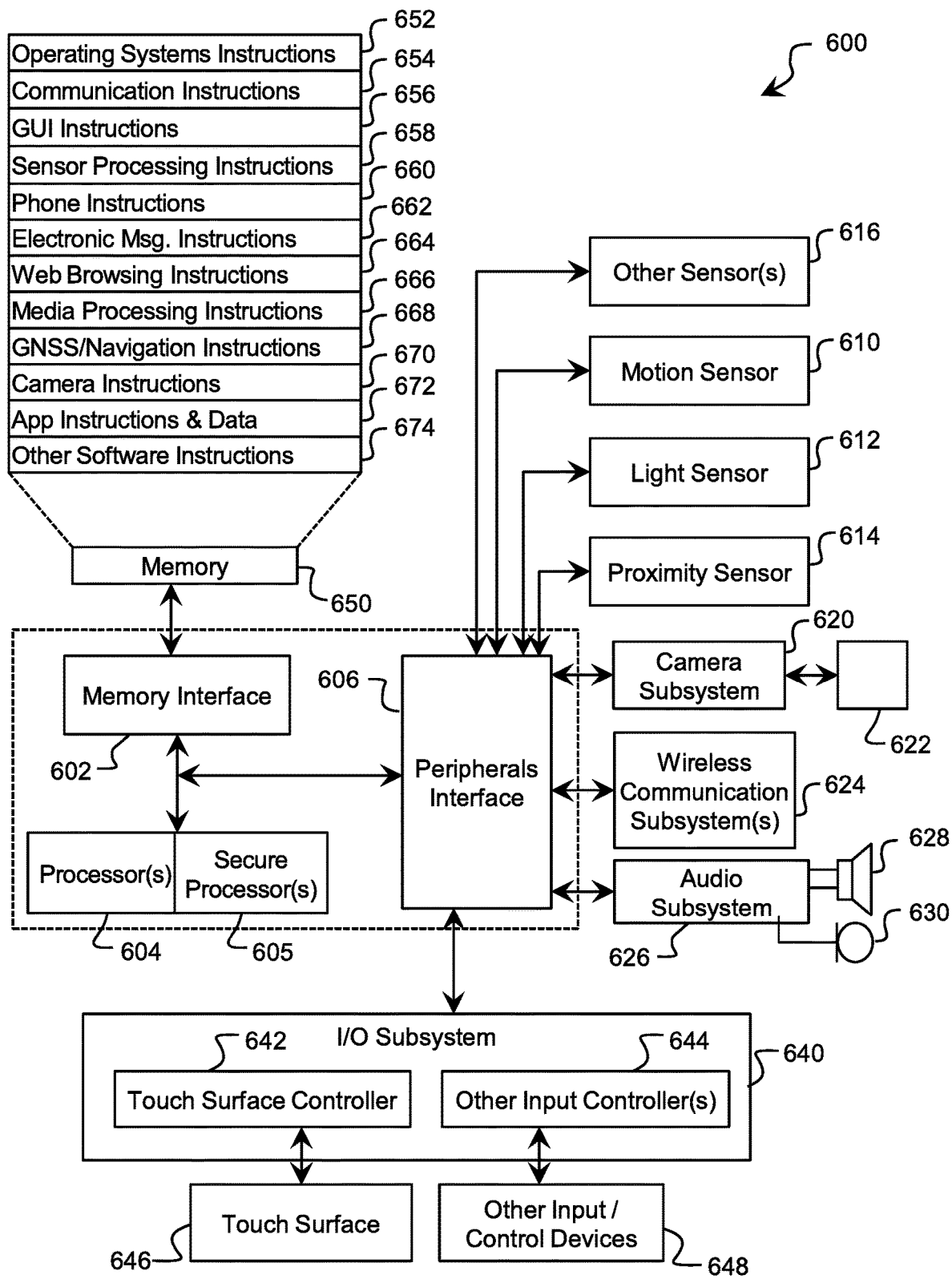
FIG. 6 depicts an exemplary user device that may be used within the system of FIG. 1, according to embodiments of the disclosure.

FIG. 6 shows a user device 600, according to an embodiment of the present disclosure. The illustrative user device 600 may include a memory interface 602, one or more data processors, image processors, central processing units 604, and/or secure processing units 605, and a peripherals interface 606. The memory interface 602, the one or more processors 604 and/or secure processors 605, and/or the peripherals interface 606 may be separate components or may be integrated into one or more integrated circuits. The various components in the user device 600 may be coupled by one or more communication buses or signal lines.

Sensors, devices, and subsystems may be coupled to the peripherals interface 606 to facilitate multiple functionalities. For example, a motion sensor 610, a light sensor 612, and a proximity sensor 614 may be coupled to the peripherals interface 606 to facilitate orientation, lighting, and proximity functions. Other sensors 616 may also be connected to the peripherals interface 606, such as a global navigation satellite system (GNSS) (e.g., GPS receiver), a temperature sensor, a biometric sensor, depth sensor, magnetometer, or another sensing device, to facilitate related functionalities.

A camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. The camera subsystem 620 and the optical sensor 622 may be used to collect images of a user to be used during authentication of a user. e.g., by performing facial recognition analysis.

Communication functions may be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 624. The specific design and implementation of the communication subsystems 624 may depend on the communication network(s) over which the user device 600 is intended to operate. For example, the user device 600 may include communication subsystems 624 designed to operate over a GSM network, a GPRS network, an EDGE network, a WiFi or WiMax network, and a Bluetooth™ network. For example, the wireless communication subsystems 624 may include hosting protocols such that the device 600 can be configured as a base station for other wireless devices and/or to provide a WiFi service.

An audio subsystem 626 may be coupled to a speaker 628 and a microphone 630 to facilitate voice-enabled functions, such as speaker recognition, voice replication, digital recording, and telephony functions. The audio subsystem 626 may be configured to facilitate processing voice commands, voiceprinting, and voice authentication, for example.

The I/O subsystem 640 may include a touch-surface controller 642 and/or another input controller(s) 644. The touch-surface controller 642 may be coupled to a touch surface 646. The touch surface 646 and touch-surface controller 642 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of the speaker 628 and/or the microphone 630.

In some implementations, a pressing of the button for a first duration may disengage a lock of the touch surface 646; and a pressing of the button for a second duration that is longer than the first duration may turn power to the user device 600 on or off. Pressing the button for a third duration may activate a voice control, or voice command, a module that enables the user to speak commands into the microphone 630 to cause the device to execute the spoken command. The user may customize a functionality of one or more of the buttons. The touch surface 646 can, for example, also be used to implement virtual or soft buttons and/or a keyboard.

In some implementations, the user device 600 may present recorded audio and/or video files, such as MP3, AAC, and MPEG files. In some implementations, the user device 600 may include the functionality of an MP3 player, such as an iPod™. The user device 600 may, therefore, include a 36-pin connector and/or 8-pin connector that is compatible with the iPod. Other input/output and control devices may also be used.

The memory interface 602 may be coupled to memory 650. The memory 650 may include high-speed random access memory and/or non-volatile memory, such as one or more magnetic disk storage devices, one or more optical storage devices, and/or flash memory (e.g., NAND, NOR). The memory 650 may store an operating system 652, such as Darwin, RTXC, LINUX, UNIX, OS X, WINDOWS, or an embedded operating system such as VxWorks.

The operating system 652 may include instructions for handling basic system services and for performing hardware dependent tasks. In some implementations, the operating system 652 may be a kernel (e.g., UNIX kernel). In some implementations, the operating system 652 may include instructions for performing voice authentication.

The memory 650 may also store communication instructions 654 to facilitate communicating with one or more additional devices, one or more computers and/or one or more servers. The memory 650 may include graphical user interface (GUI) instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 may store application instructions and data 672 for recognizing GUIs as specific to a particular e-commerce merchant; parsing document object model (DOM) elements and other components or representations of e-commerce application GUIs to distinguish GUIs having receipt information from GUIs not including receipt information; capturing receipt information from GUIs having receipt information; sending receipt information to a server device; and rendering transactions augmented with item level receipt data in an online banking application. In various implementations, application data may include e-commerce application data (e.g., GUIs, content, user data, and/or other data used or generated by an e-commerce application), online banking application data (e.g., GUIs, content, user data, and other data used or generated by an online banking application), capture agent data (e.g., receipt information, state information, merchant specific data, and other data used or generated by a capture application), and other information used or generated by other applications persisted on a user device.

The memory 650 may also store other software instructions 674, such as web video instructions to facilitate web video-related processes and functions; and/or web shopping instructions to facilitate web shopping-related processes and functions. In some implementations, the media processing instructions 666 may be divided into audio processing instructions and video processing instructions to facilitate audio processing-related processes and functions and video processing-related processes and functions, respectively.

Each of the above-identified instructions and applications may correspond to a set of instructions for performing one or more functions described herein. These instructions need not be implemented as separate software programs, procedures, or modules. The memory 650 may include additional instructions or fewer instructions. Furthermore, various functions of the user device 600 may be implemented in hardware and/or in software, including in one or more signal processing and/or application specific integrated circuits.

In some embodiments, processor 604 may perform processing including executing instructions stored in memory 650, and secure processor 605 may perform some processing in a secure environment that may be inaccessible to other components of user device 600. For example, secure processor 605 may include cryptographic algorithms on board, hardware encryption, and physical tamper proofing. Secure processor 605 may be manufactured in secure facilities. Secure processor 605 may encrypt data/challenges from external devices. Secure processor 605 may encrypt entire data packages that may be sent from user device 600 to the network. Secure processor 605 may separate a valid user/external device from a spoofed one, since a hacked or spoofed device may not have the private keys necessary to encrypt/decrypt, hash, or digitally sign data, as described herein.

The foregoing description is intended to convey a thorough understanding of the embodiments described by providing a number of specific exemplary embodiments and details involving capturing receipt information and associating receipt information with transaction data to improve functionality of online banking systems. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A user device and server device are used as examples for the disclosure. The disclosure is not intended to be limited GUI display screens, image capture systems, data extraction processors, and client devices only. For example, many other electronic devices may utilize a system to capture receipt information and associate receipt information with transaction data to improve functionality of online banking systems.

Methods described herein may represent processing that occurs within a system (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including, by ways of example, semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the terms "and/or" and "at least one of" include any and all combinations of one or more of the associated listed items.

Certain details are set forth in the foregoing description and in FIGS. 1-6 to provide a thorough understanding of various embodiments of the present invention. Other details describing well-known structures and systems often associated with image processing, online banking systems, user devices, and server devices, etc., however, are not set forth below to avoid unnecessarily obscuring the description of the various embodiments of the present invention.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computer-implemented method for improving the accuracy of online banking systems, the method comprising:
   storing, by a computer, an e-commerce application and an online banking application, wherein the online banking application comprises a link;
   downloading, by the computer, a capture agent via the link wherein the capture agent comprises a cache and a merchant logic, wherein the merchant logic comprises capture information for a plurality of merchant websites;
   determining, by the computer, that a user of the computer is purchasing at least one product from a website of a merchant using the e-commerce application;
   displaying, by the e-commerce application, a plurality of graphical user interfaces (GUIs) of the merchant website;

identifying, by the computer, based on the displayed plurality of GUIs and from the capture information for a plurality of merchant websites, capture information for the merchant website;

determining, by the capture agent, that at least one of the displayed plurality of GUIs comprises a receipt;

capturing, by the capture agent, from the at least one of the displayed plurality of GUIs, a portion of the receipt, using the capture information for the merchant website;

storing, by the capture agent, the captured portion of the receipt, in the cache;

determining, by the capture agent, and via the e-commerce application and the displayed plurality of graphical user interfaces, that the user has purchased the product from the merchant website; and, based on the determination, transmitting, by the capture agent, the captured portion in the cache, to a server device.

2. The computer-implemented method of claim 1, wherein the capture agent comprises a plug-in for a web browser.

3. The computer-implemented method of claim 2, wherein the capture agent is downloaded, via the link, from the server device.

4. The computer-implemented method of claim 3, wherein the captured portion includes Document Object Model (DOM) elements.

5. The computer-implemented method of claim 1, wherein the capture agent comprises a plug-in for a mobile application.

6. The computer-implemented method of claim 5, wherein the captured portion includes Document Object Model (DOM) elements.

7. A non-transitory computer readable media storing executable instructions that when executed by a processor causes the processor to perform the operations of:

storing an e-commerce application and an online banking application, wherein the online banking application comprises a link;

downloading a capture agent via the link wherein the capture agent comprises a cache and a merchant logic, wherein the merchant logic comprises capture information for a plurality of merchant websites;

determining that a user is purchasing at least one product from a website of a merchant using the e-commerce application;

displaying, via the e-commerce application, a plurality of graphical user interfaces (GUIs) of the merchant website;

identifying based on the displayed plurality of GUIs and from the capture information for a plurality of merchant websites, capture information for the merchant website;

determining, via the capture agent, that at least one of the displayed plurality of GUIs comprises a receipt;

capturing, via the capture agent, from the at least one of the displayed plurality of GUIs, a portion of the receipt, using the capture information for the merchant website;

storing, via the capture agent, the captured portion of the receipt, in the cache;

determining, via the capture agent, and via the e-commerce application and the displayed plurality of graphical user interfaces, that the user has purchased the product from the merchant website; and, based on the determination, transmitting, via the capture agent, the captured portion in the cache, to a server device.

8. The non-transitory computer readable media of claim 7, wherein the capture agent comprises a plug-in for a web browser.

9. The non-transitory computer readable media of claim 7, wherein the capture agent is downloaded, via the link, from the server device.

10. The non-transitory computer readable media of claim 7, wherein the captured portion of the receipt includes Document Object Model (DOM) elements.

11. The non-transitory computer readable media of claim 7, wherein the capture agent comprises a plug-in for a mobile application.

12. The non-transitory computer readable media of claim 7, wherein the captured portion of the receipt includes Document Object Model (DOM) elements.

13. A system comprising:

a processor;

a memory storing executable instructions that when executed by the processor causes the processor to perform the operations of:

storing an e-commerce application and an online banking application, wherein the online banking application comprises a link;

downloading a capture agent via the link wherein the capture agent comprises a cache and a merchant logic, wherein the merchant logic comprises capture information for a plurality of merchant websites;

determining that a user is purchasing at least one product from a website of a merchant using the e-commerce application;

displaying, via the e-commerce application, a plurality of graphical user interfaces (GUIs) of the merchant website;

identifying based on the displayed plurality of GUIs and from the capture information for a plurality of merchant websites, capture information for the merchant website;

determining, via the capture agent, that at least one of the displayed plurality of GUIs comprises a receipt;

capturing, via the capture agent, from the at least one of the displayed plurality of GUIs, a portion of the receipt, using the capture information for the merchant website;

storing, via the capture agent, the captured portion of the receipt, in the cache;

determining, via the capture agent, and via the e-commerce application and the displayed plurality of graphical user interfaces, that the user has purchased the product from the merchant website; and, based on the determination, transmitting, via the capture agent, the captured portion in the cache, to a server device.

14. The system of claim 13, wherein the capture agent comprises a plug-in for a web browser.

15. The system of claim 13, wherein the capture agent is downloaded, via the link, from the server device.

16. The system of claim 13, wherein the captured portion of the receipt includes Document Object Model (DOM) elements.

17. The system of claim 13, wherein the capture agent comprises a plug-in for a mobile application.

18. The system of claim 13, wherein the captured portion of the receipt includes Document Object Model (DOM) elements.

* * * * *